United States Patent
Argoitia

(10) Patent No.: US 9,732,228 B2
(45) Date of Patent: Aug. 15, 2017

(54) MANUFACTURING OF DIFFRACTIVE PIGMENTS BY FLUIDIZED BED CHEMICAL VAPOR DEPOSITION

(75) Inventor: Alberto Argoitia, Santa Rosa, CA (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 0 days.

(21) Appl. No.: 13/586,525

(22) Filed: Aug. 15, 2012

(65) Prior Publication Data

US 2013/0045338 A1    Feb. 21, 2013

Related U.S. Application Data

(60) Provisional application No. 61/524,128, filed on Aug. 16, 2011.

(51) Int. Cl.
*C23C 16/44* (2006.01)
*C09C 1/00* (2006.01)

(52) U.S. Cl.
CPC .......... *C09C 1/0015* (2013.01); *C09C 1/0021* (2013.01); *C09C 1/0024* (2013.01); *C09C 1/0051* (2013.01); *C01P 2002/85* (2013.01); *C01P 2004/03* (2013.01); *C01P 2004/04* (2013.01); *C09C 2200/1004* (2013.01); *C09C 2200/1008* (2013.01); *C09C 2210/30* (2013.01); *C09C 2210/40* (2013.01)

(58) Field of Classification Search
None
See application file for complete search history.

(56) References Cited

U.S. PATENT DOCUMENTS

| | | | |
|---|---|---|---|
| 4,978,394 A | 12/1990 | Ostertag et al. | 106/404 |
| 5,364,467 A | 11/1994 | Schmid et al. | 106/404 |
| 5,374,306 A | 12/1994 | Schlegel et al. | 106/404 |
| 6,241,858 B1 | 6/2001 | Phillips et al. | 204/192.15 |
| 6,565,770 B1 * | 5/2003 | Mayer et al. | 252/301.36 |
| 6,692,830 B2 | 2/2004 | Argoitia et al. | 428/403 |
| 6,777,085 B1 | 8/2004 | Argoitia et al. | 428/403 |
| 7,264,670 B2 | 9/2007 | Ruger et al. | 106/404 |
| 2001/0041217 A1* | 11/2001 | Sanjurjo et al. | 427/213 |
| 2002/0076483 A1* | 6/2002 | Fan et al. | 427/64 |
| 2003/0129404 A1* | 7/2003 | Argoitia et al. | 428/403 |
| 2003/0190473 A1* | 10/2003 | Argoitia | G02B 5/1861 428/403 |

(Continued)

FOREIGN PATENT DOCUMENTS

| | | |
|---|---|---|
| CN | 1225659 A | 8/1999 |
| DE | 19618568 | 11/1997 |

(Continued)

OTHER PUBLICATIONS

Jung, Ind. Eng. Chem. Res. 2004, V43, p. 5483.*
Search Report from Ep Appln No. 12180384 dated Nov. 23, 2012.

*Primary Examiner* — Joseph Miller, Jr.
(74) *Attorney, Agent, or Firm* — Mannava & Kang, P.C.

(57) ABSTRACT

Microstructured pigments include a dielectric core having a diffraction grating. The microstructured dielectric core is encapsulated with one or more encapsulation layers which are deposited using chemical vapor deposition in a fluidized bed. The fluidizing conditions allow for providing uniform and highly-conforming encapsulation layers.

15 Claims, 12 Drawing Sheets

(56) References Cited

U.S. PATENT DOCUMENTS

2003/0224164 A1* 12/2003 Argoitia ................ C09C 1/0015
  428/403
2004/0224087 A1* 11/2004 Weimer et al. ................ 427/212
2008/0107856 A1* 5/2008 Argoitia .................... G09F 3/02
  428/43

FOREIGN PATENT DOCUMENTS

| EP | 0950693 | 10/1999 |
| EP | 1469040 | 10/2004 |
| WO | 03/053674 | 7/2003 |

\* cited by examiner

US 9,732,228 B2

MANUFACTURING OF DIFFRACTIVE PIGMENTS BY FLUIDIZED BED CHEMICAL VAPOR DEPOSITION

CROSS-REFERENCE TO RELATED APPLICATIONS

The present invention claims priority from U.S. Provisional Patent Application No. 61/524,128 filed Aug. 16, 2011, which is incorporated herein by reference for all purposes.

TECHNICAL FIELD

The present invention relates generally to thin-film pigment flakes, and more particularly to a method of manufacturing of microstructured pigment flakes.

BACKGROUND OF THE INVENTION

Specialty pigments have been developed for use in security applications, such as anti-counterfeiting devices printed on banknotes, packaging of high-value items, seals for containers, and even for direct application to commercial items. For example, the U.S. twenty-dollar Federal Reserve Note currently uses optically variable ink The number "20" printed in the lower-right corner of the face of the note changes color as the viewing angle changes. This is an overt anti-counterfeiting device. The color-shifting effect is not reproducible by ordinary color photocopiers, and someone receiving a note can observe whether it has the color-shifting security feature to determine the note's authenticity.

Other high-value documents and objects use similar measures. For example, iridescent pigments or diffractive pigments are used in paints and inks that are applied directly to an article, such as a stock certificate, passport, original product packaging, or to seals that are applied to an article. Security features that are more difficult to counterfeit are desirable as counterfeiters continue to become more sophisticated.

One anti-counterfeiting approach uses microscopic symbols on multi-layer color-shifting pigment flakes. The symbols are formed on at least one of the layers of the multi-layer color-shifting pigment flakes by a local change of an optical property(s), such as reflectivity. The multi-layer color-shifting pigment flakes may have an all-dielectric design, or a metal-dielectric design. The symbols may be stamped or embossed or etched in the pigments by mechanical means or formed by laser means.

The microstructured flakes having a diffraction grating or a symbol are often need additional layers e.g. for providing a color-shifting effect. A conventional approach is to use roll-to roll coating. A roll of a sheet of polymer substrate material (also known as a "web") is passed through a deposition zone and coated with one or more thin film layers. Multiple passes of the roll of polymer substrate back and forth through the deposition zone(s) may be made. The deposited coating is then separated from the polymer substrate and processed into flake. However, mass production of such pigments requires very long deposition substrates, and the roll-to-roll technology is inconvenient in this situation.

Accordingly, it is desirable to provide a method of manufacturing microstructured multilayered pigment flakes that overcome the limitations of the techniques discussed above.

All-dielectric interference structures may be formed of dielectric layers with different indices of refraction. Various combinations of these layers can be utilized to achieve the desired optically variable effect. The all-dielectric pigment flakes may be microstructured, they may include indicia for security purposes or have a diffraction grating which provides an optically variable effect.

Another object of the present invention is to provide an efficient method for manufacturing all-dielectric microstructured flakes.

SUMMARY OF THE INVENTION

A method is provided for forming a microstructured pigment flake. The method includes providing a microstructured dielectric core to a fluidized bed and encapsulating the microstructured dielectric core by chemical vapor deposition while in the fluidized bed so as to form an encapsulation layer encapsulating the microstructured dielectric core.

Another aspect of the present invention provides all-dielectric diffractive pigment flakes which include a diffractive core and one or more highly-conforming encapsulating layers, wherein the encapsulating layers are provided using chemical vapor deposition while the flakes are in the fluidized bed.

BRIEF DESCRIPTION OF THE DRAWINGS

The invention will be described in greater detail with reference to the accompanying drawings which represent preferred embodiments thereof, wherein.

DETAILED DESCRIPTION OF EXEMPLARY EMBODIMENTS

A multilayer optical flake may provide a diffractive optical effect due to a diffractive microstructure on the surface of the flake, and a color-shifting effect due to light interference caused by the layered structure. The diffractive microstructure may be formed in a dielectric core which is then encapsulated with one or more encapsulation layers. It is desirable to have the coated layers totally, or at least as much as possible, conforming to the microstructure of the diffractive core in order to yield desired optical effects based on combined thin film interference of the layered coating and diffractive interference from the microstructure.

When an all dielectric optical design is formed on a grated surface, instead of a flat surface, the resulting micro-structured flakes exhibit a color shift with a change in viewing angle, caused by thin film interference and diffractive interference simultaneously. The combination of interference effects can efficiently happen only if all the interfaces between the high and low index dielectric materials layers possess the grated microstructure. In the event the encapsulating layer(s) are not conforming, the diffractive effect is lost, or at least severely diminished, and the pigments exhibit only, or mostly, thin film interference. Accordingly, it is important that the technology chosen for encapsulation of diffractive core flakes be capable of reproducing the microstructure in the encapsulating layer(s). In other words, the deposited layers should be highly conforming to the original microstructure of the core flakes.

Figure 1:
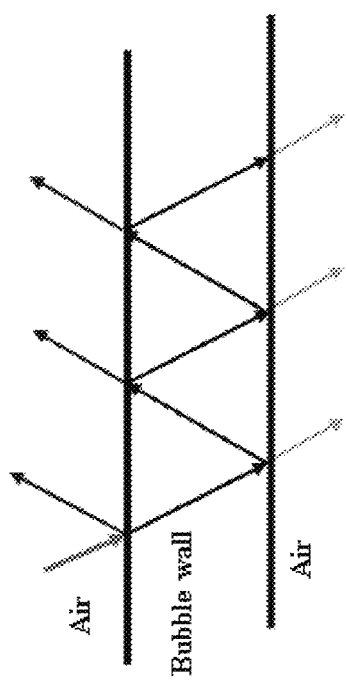
FIG. 1 is a schematic diagram illustrating thin film interference.

Thin film interference occurs when a light wave encounters a boundary between semi-transparent materials with different indices of refraction, which causes the light wave to separate into a reflected and a transmitted wave. The reflected light beam experiences a phase shift of 180° when the second material has an index of refraction higher than the first material. A typical example is a soap bubble. FIG. 1 illustrates a cross-section of a soap bubble (n=1.33) which is filled and surrounded by the air (n=1). The first transmitted wave travels to the internal bubble/air interface to be separated again into a reflected and a transmitted wave. The process repeats producing an infinite number of reflected and transmitted waves. The conditions for constructive and destructive interferences are different for various wavelengths of the incident white light creating the attractive colors observed in the light reflected by the soap bubble.

Diffractive interference, or diffraction, occurs when a traveling wave encounters an obstacle of dimensions similar to its wavelength. If the obstacle is periodic, some of the energy of the wave is scattered into various discrete directions (diffracted orders). Such an optical device is called a "diffraction grating."

Figure 3:
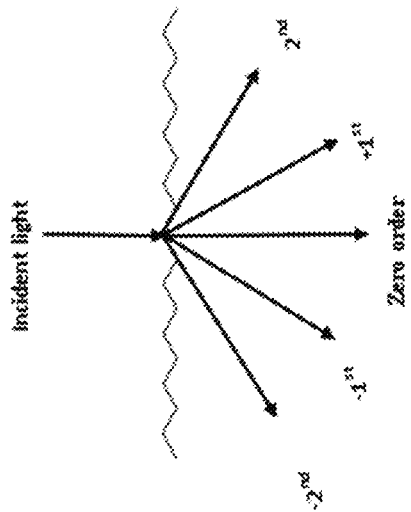
FIGS. 2 and 3 are schematic diagrams illustrating diffractive interference.
Figure 2:
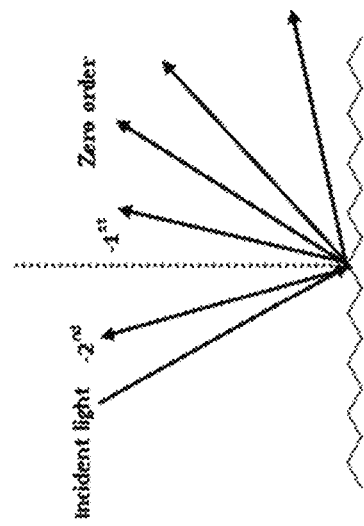

A diffraction grating is an optical component made by an assembly of reflecting or transmitting elements separated by a distance comparable to the wavelength of the incident light. When monochromatic light is incident on a grating, it is diffracted in discrete directions. In a grating, as shown in FIG. 2, each grating grove behaves as a small, slit-shaped source of diffracted light. The light diffracted by each groove combines to form a diffracted wavefront. As illustrated in FIG. 2, light incident on a grating surface at an angle that is not normal to the surface creates a zero order or specular reflection. The diffraction grating creates first order diffracted light beams (−1st order and 1st order) at the sides of the zero order reflection. Similarly, second and higher order diffracted lights can be created at higher angles. Diffraction can also occur on transmission as illustrated on FIG. 3.

Figure 4:
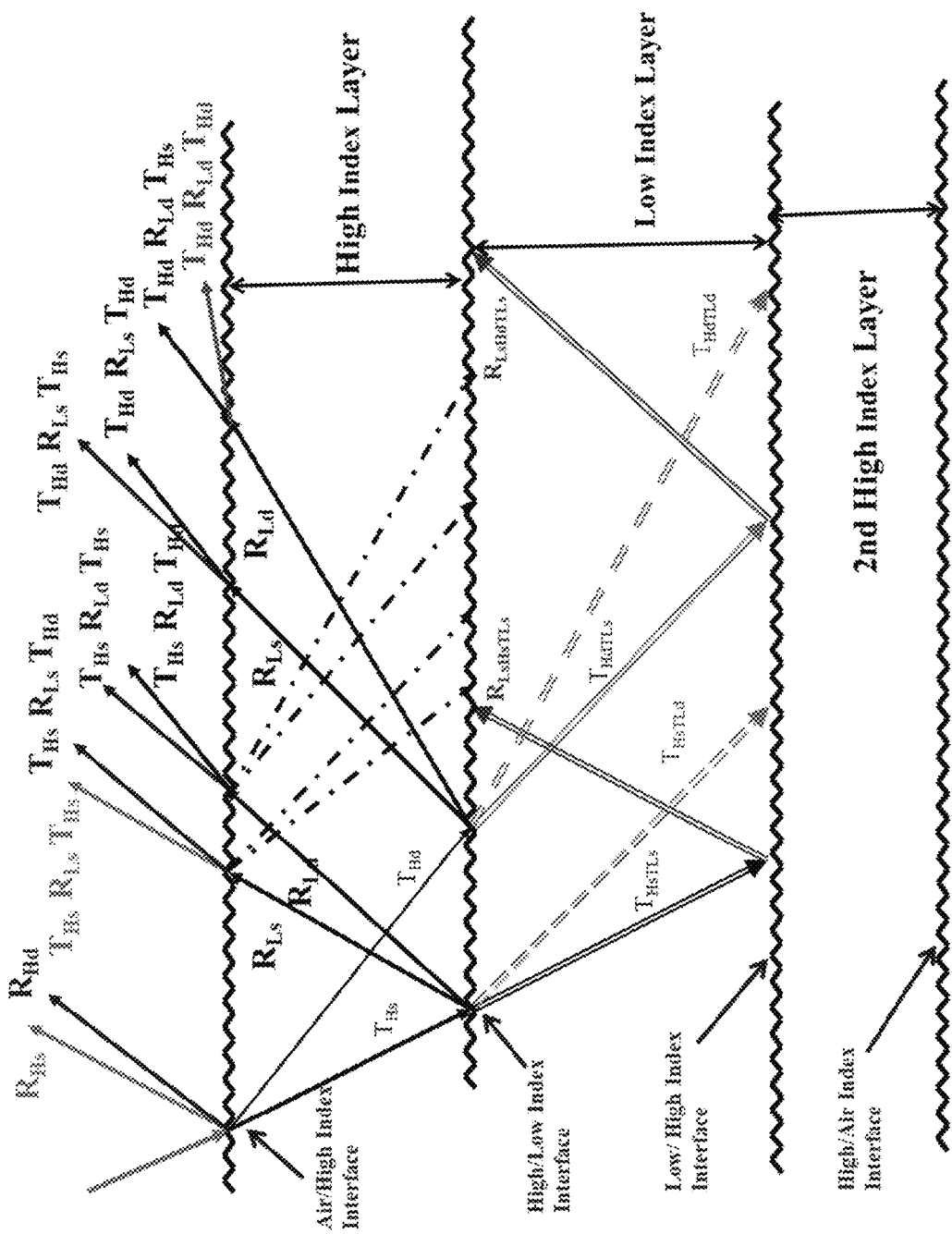
FIG. 4 is a schematic diagram illustrating interference in a three layer High/Low/High index dielectric diffractive pigment.

The combination of the thin film and diffractive interference effects will be further discussed relative to an exemplary three-layer all-dielectric pigment of the type HLH surrounded by the air, where H stands for a high refractive index layer having a refractive index greater than 1.65 and less than 2.7 and L stands for a low refractive index layer having a refractive index less than or equal to 1.65 and greater than 1.3. FIG. 4 schematically shows the specular and some of the diffracted beams that are reflected and/or transmitted at the Air/High index and High index/Low index interfaces boundaries of the pigment. In effect, an incident beam is reflected according to the laws of reflection or diffraction, and the transmitted beam can proceed in the specular direction or in a diffracted direction within the layer. Only the first transmitted beams which go through the High index and Low index layers to be later reflected by the High index/Low index interface are considered. Second internal reflections from the Low index/High index interface are shown as dash arrows and their trajectory is not considered. The subscripts "s" and "d" refer to specular and diffracted reflected or transmitted beams, respectively. R and T refer to a reflected or transmitted beam, and H and L to the High refractive index dielectric and Low refractive index dielectric layers. For example, with this nomenclature, RLs represents a specular beam reflected from the High index/Low index interface layer, and THd—a diffracted beam transmitted through the Air/High index interface.

Only the first specular reflected beam from the Air/High index interface (RHs) and the specular transmitted (H)/reflected (L)/transmitted(H) marked as THsRLsTHs are showed contributing to the specular reflection. Notice that this optical path is equivalent to the path for pure thin film interference.

With respect to the diffraction, consider the waves which have undergone one diffractive interaction. The reflected beam labeled RHd is the only one from the Air/High index interface. Three other waves which traverse the layer and have undergone one diffraction are THdRLsTHs, THsRLdTHs and THsRLsTHd. These three waves interfere with each other and with the wave labeled RHd. Notice that the optical paths involved in defining the interference are not the same as for the specular beam.

Specular transmitted beams (double arrowed) from the High/Low index interfaces that previously followed specular and diffractive interference at the Air/High index interference are labeled as THsTLs and THdTLs respectively.

Diffractive transmitted beams (double arrowed) from the High/Low index interfaces that previously followed specular and diffractive interference at the Air/High index interference are labeled as THsTLd and THdTLd respectively.

Even the consideration of these first few waves is complicated. For example, only the first reflected beams from the Low index/High index interface that previously followed specular and diffractive transmission from the low and high index layers are indicated. Each one of these beams will themselves follow multiples compounded intra-layer and inter-layer reflections and transmissions from both specular and diffractive interferences when entering and exiting the second high index material trough the transmission and the interface with air and/or at the Low/High index interface.

FIG. 4 shows optical paths of light occurring if the multilayer coating follows perfectly the grated microstructure of the core flakes. In the event the encapsulating layers fail to conform to the diffractive structure of the core, the diffractive effect does not occur and the pigment exhibits mostly thin film interference.

We have noticed that conventional encapsulation techniques such as the sol-gel method which includes decomposition of metal alkoxides in the presence of water with subsequent drying and annealing or wet chemistry based on precipitation from aqueous metallic salt solutions followed by drying and calcination fail to produce sufficiently-conforming coatings. Our experiments show that Fluidized Bed Chemical Vapor Deposition (FBCVD) technology improves the conformity of encapsulating layer(s) to microstructured dielectric pre-flakes (cores). The experimental results are discussed further with reference to FIGS. 7A-10.

Figure 5A:
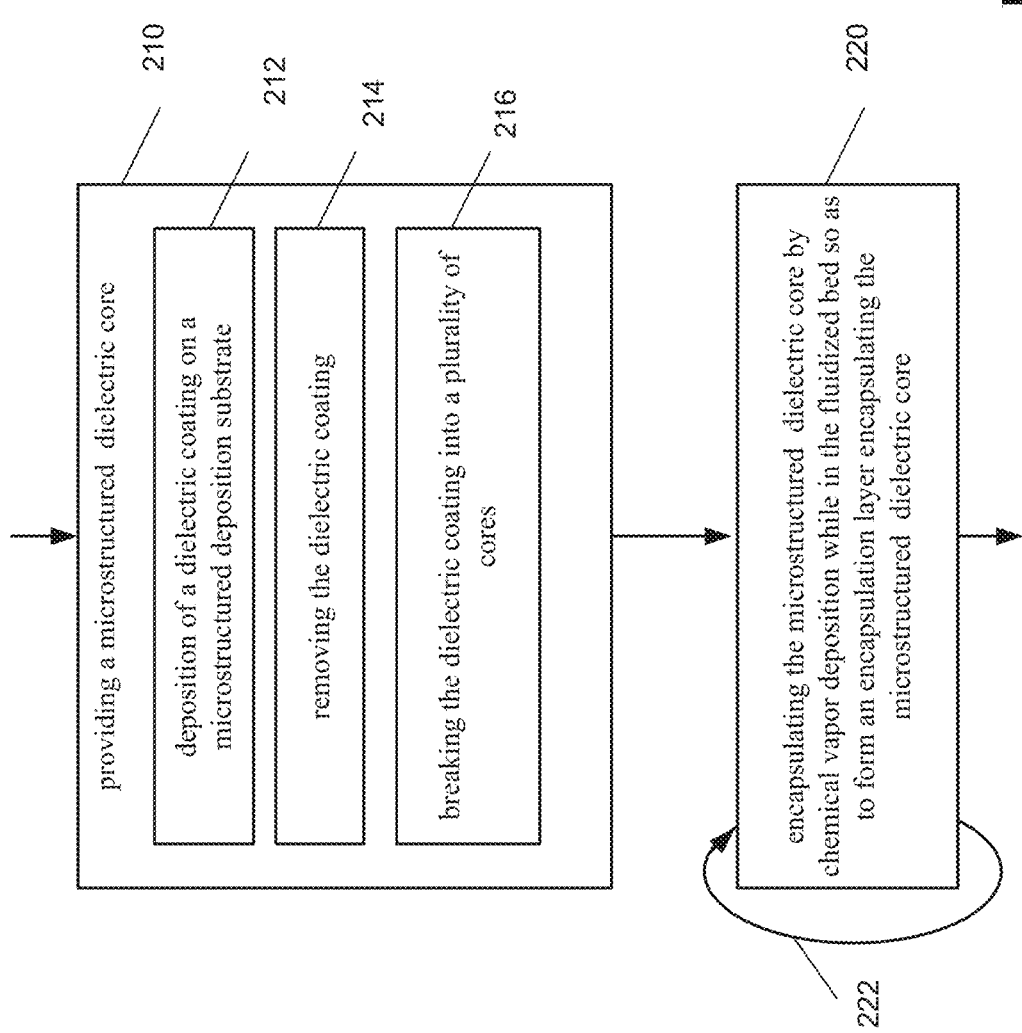
FIG. 5A is a flow-chart of a method of manufacturing microstructured pigment flakes.

With reference to FIG. 5A, the method of forming a microstructured pigment flake includes a core step 210 wherein a microstructured dielectric core is provided into a fluidized bed, and an encapsulation step 220 wherein the microstructured dielectric core is encapsulated with one or more encapsulation layers encapsulating the microstructured dielectric core; chemical vapor deposition is used while the microstructured core is in the fluidized bed. The core providing step 210 may include deposition of a dielectric coating on a microstructured deposition substrate 212, removing the dielectric coating 214, and breaking the dielectric coating into a plurality of cores including the microstructured dielectric core, step 216.

Microstructured pigment flakes may include a dielectric core and one or more encapsulating layers. The flake core may have a microstructure formed therein, and is manufactured by deposition of one or more dielectric thin film layers on a microstructured deposition substrate, such as a plastic film, the deposition step 212, separating the thin film layer(s) from the substrate 214, and processing the separated thin film layer(s), e.g. by milling and sieving, into pre-flakes, the breaking step 216. The pre-flakes, or cores, are encapsulated with a thin film layer during the encapsulation step 220. Optionally, the additional encapsulating step 222 may be performed so as produce more than one encapsulating layer. The resulting pigment flakes are typically about 5-100 microns across, and more typically about 20-100 microns across.

The core may include a single dielectric layer or multiple dielectric layers with a diffractive structure formed in the surface of the core. Depending on the desired optical colors and effects, suitable grated microstructures are selected for the production of diffractive flakes with diffractive effects. For example, the pigment flakes can include a diffractive grating microstructure with the grating frequency in the range of from about 400 grating lines per mm (ln/mm) to 4000 ln/mm in order to create a wide range of optical effects.

In one embodiment, a pre-flake includes microstructured indicia, e.g. a symbol, which is typically about 0.5-20 microns in diameter. In a particular embodiment, the symbols are about 700 nanometers in diameter, and in another embodiment the symbols are about 15 microns in diameter.

The microstructure such as symbols or gratings is typically embossed or cast on the deposition substrate, and the thin film dielectric layer(s) are deposited over the embossed deposition substrate. The microstructure on the surface of the substrate is replicated in at least the first thin film layer that is deposited on the substrate, in either positive or negative relief. Then the coating of the thin film layer(s) is separated from the deposition substrate and processed into microstructured pre-flakes to be used as cores in the encapsulation step 220.

Preferably, the microstructured core is formed of one or more dielectric materials in order to produce semi-transparent dichroic pigments which cannot be achieved when using an opaque metal core.

The microstructured dielectric flakes may be mixed with a carrier, such as an ink vehicle or a paint vehicle, to form a composition, such as ink or paint or mixed in a clear carrier to form a varnish. Examples of carriers include polyvinyl alcohol, polyvinyl acetate polyvinylpyrrolidone, poly(ethoxyethylene), poly(methoxyethylene), poly(acrylic) acid, poly(acrylamide), poly(oxyethylene), poly(maleic anhydride), hydroxyethyl cellulose, cellulose acetate, poly(sacchrides) such as gum arabic and pectin, poly(acetals), such as polyvinylbutyral, poly(vinyl halides), such as polyvinyl chloride and polyvinylene chloride, poly(dienes) such as polybutadiene, poly(alkenes) such as polyethylene, poly(acrylates) such as polymethyl acrylate, poly(methacrylates) such as poly methylmethacrylate, poly(carbonates) such as poly(oxycarbonyl oxyhexamethylene), poly(esters) such as polyethylene terephthalate, poly(urethanes), poly(siloxanes), poly(suphides), poly(sulphones), poly(vinylnitriles), poly(acrylonitriles), poly(styrene), poly(phenylenes) such as poly(2,5 dihydroxy-1,4-phenyleneethylene), poly(amides), natural rubbers, formaldahyde resins and other polymers.

In one embodiment, the deposition substrate is embossed with a diffraction grating pattern. Accordingly, flake cores formed by deposition of a dielectric thin film layer onto the grated surface also have the grating pattern in one or both sides of the flakes. Alternatively, the dielectric cores may include more than one dielectric layer formed by deposition of thin film layers onto the deposition substrate prior to removing the coating and breaking it into individual pre-flakes.

The microstructured deposition substrate which includes a microstructure such as a diffraction grating and/or symbols may be made of plastic materials such as polyvinyl chloride, polycarbonate, polyacrylate, and PET type G. The methods that can be used to form the surface relief pattern in the deposition substrate are well known by those skilled in the art. For example, a surface of the substrate may be embossed by pressing it in contact with a heated nickel embossing shim at high pressure. Other methods include photolithography and molding of the plastic substrate against a patterned surface.

The layer(s) of microstructured flake core may be deposited using a variety of conventional techniques, such as PVD using electron beam or resistive heating evaporation, reactive DC sputtering, Radio Frequency (RF) sputtering, Magnetron sputtering, chemical vapor deposition (CVD), plasma enhanced chemical vapor deposition (PECVD), or the like.

Suitable materials for the dielectric flake core include those having a "high" index of refraction, defined herein as greater than about 1.65, as well as those having a "low" index of refraction, which is defined herein as about 1.65 or less.

Examples of suitable high refractive index materials for dielectric core include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like.

Suitable low refractive index materials for dielectric core include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less.

Figure 5B:
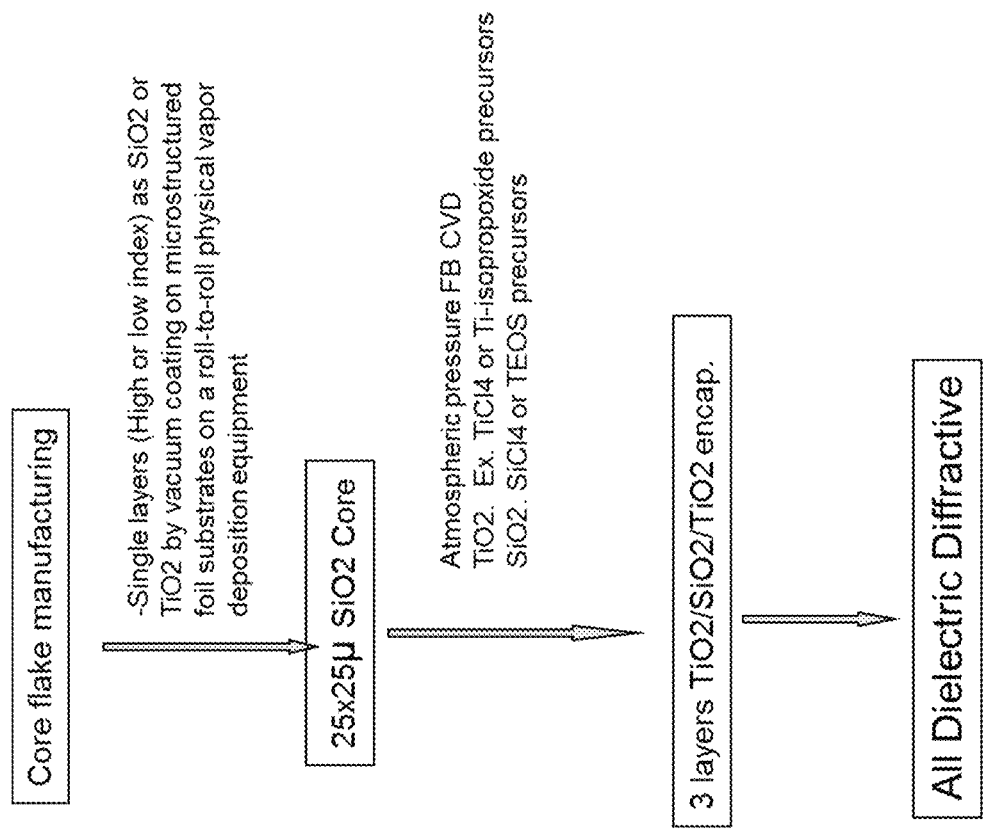
FIG. 5B is a schematic diagram illustrating manufacturing of pigment flakes.

FIG. 5B illustrates manufacturing of microstructured pigment flakes formed of high and low index dielectric materials with a symmetric design obtained by encapsulation of a core diffractive flake. Preferably, the core flake is made of a single layer of a dielectric material that can have a low or high index of refraction. In the particular example illustrated in FIG. 5B, a low index dielectric core formed of SiO2 was encapsulated with a high index material TiO2 so as to produce a 3-layer (HLH) design. The TiO2 encapsulating layer was obtained by chemical vapor deposition starting with TiCl4 as the precursor material in the presence of water in the form of vapor at 200C for about 1 hour following the reaction:

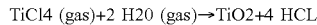

TiCl4 (gas)+2 H2O (gas)→TiO2+4 HCL

Suitable materials for the encapsulating layers include the same dielectric materials which may be used for the core. By way of example, a 5-layer (HLHLH) design can be obtained by encapsulation of a TiO2 core pre-flake by deposition of a layer of SiO2 followed by a layer of TiO2. In another example, a 7-layer design (HLHLHLH)—by encapsulation of a low index SiO2 diffractive core flake by consecutive layers of TiO2, SiO2 and TiO2.

It is known in the art that the all-dielectric designs such as alternating high refractive index and low refractive index layers can provides optically variable effects depending on the thickness of the layers.

Alternatively, the encapsulating layers may include one or more metallic absorber layers so as to form a multilayer metal-dielectric design which would provide a color shifting effect due to interference of light. By way of example, a dielectric core formed of SiO2 and encapsulated with a metal absorber such as W, Ti, Cr, Mo forms a microstructured pigment which provides a color-shifting effect due to the metal-dielectric stack. Optical designs using a high index dielectric core encapsulated with the metal absorbers produces pigments that also have very bright colors but lower color shifting effects. Multilayer designs of alternating low and high-index layers, such as HLH, LHL, HLHLH, LHLHL, can also be encapsulated with metal absorbers. If the microstructure is a diffraction grating, the pigment may provide an optically variable effect due to diffractive interference. In the event the microstructure includes indicia, the pigments may be used for security purposes because the indicia provides a covert security feature, and the color shift—an overt security feature.

In diffractive flakes, it is desirable to have the best possible conformity of the encapsulating layer(s) to the microstructure of the core in order to yield desired visual optical effects based on diffraction, therefore we use Fluidized Bed Chemical Vapor Deposition (FBCVD) technology. The chemical vapor deposition (CVD) allows deposition of single- or multilayer coatings onto core particle surfaces; the deposited material is formed from a gaseous, liquid or solid chemical precursor. The CVD technique results in conforming encapsulating films that replicate the surface microstructure of the core flakes. The efficiency of this process depends on the contact between the surface of the particles and the film precursors. A technical solution allowing for a good contact between particles and gas precursors is to use the fluidized bed technology.

The FBCVD method is based on a chemical reaction between a precursor and a reactant. In most cases, the precursor is oxidized with the help of the reactant so as to obtain an oxide coating on the particles. Reactants providing nitrogen and carbon can form the respective nitrides and carbides coatings. Mixtures of reactants can be used for the deposition of compounds as carbonitrides, oxycarbides, oxinitrides and even oxicarbonitrides. Both, the precursor and the reactant may be in the form of gas, liquid or solid material. Preferably, the reactant is provided in a direction opposite to the flow of the precursor. Preferably, the method includes using an inert fluidizing gas for mixing the particles. Advantageously, the chemical vapor deposition may be performed at atmospheric pressure. However, low pressure or plasma activation can be used depending on the materials of the core flakes and the films to be deposited.

A variety of geometries can be used for the fluidized bed reactor; the fluidized bed should satisfy the constrains due to particle fluidization and chemical vapor deposition. The fluidized beds can operate under thermal or plasma activation of the reactive gas precursors accommodating for the type of particles to be treated.

The optical effects of special effect pigments having a combination of thin film and diffractive interference are extremely dependent on the smoothly replication of the diffractive microstructure of the core diffractive pigment pre-flakes making the FBCVD technology a perfect solution for the manufacturing of special effects pigment with optical diffractive properties.

Figure 6:
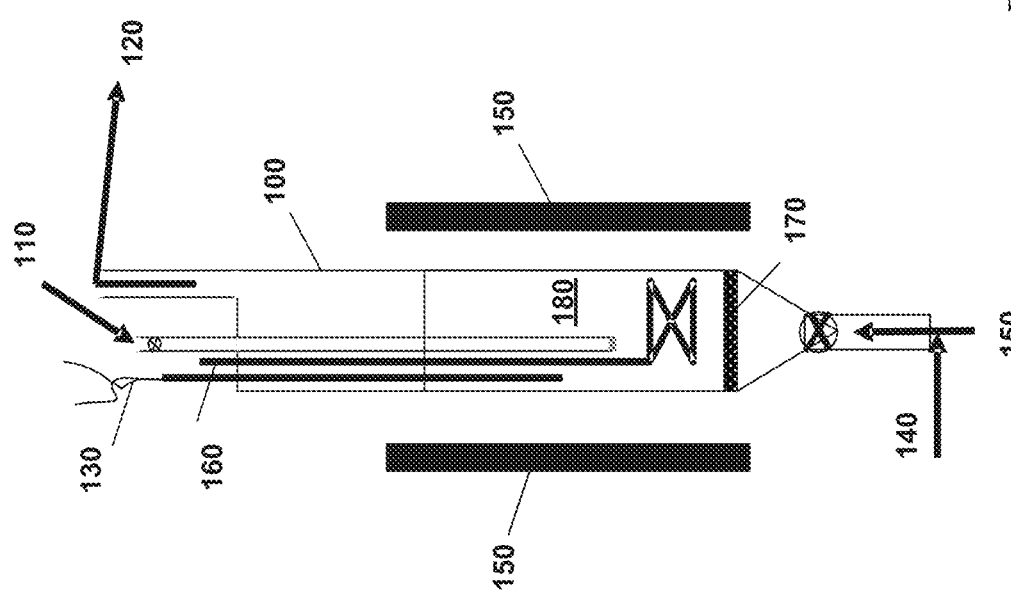
FIG. 6 is a schematic diagram of a fluidized bed for use in FBCVD.

With reference to FIG. 6, a fluidized bed reactor may be a cylindrical vessel 100 having a porous or perforated bottom plate 170 that is used to hold the particles 180 and to uniformly distribute the flow of gas over the cross area of the vessel so as to obtain uniform levitation of the particles in the bed. In operation, the gas supplied though the fluidized bed moves and partially supports the particles, so that the bulk of particles expands and behaves as a fluid spreading everywhere in the vessel. Within the fluidized bed, the flow is turbulent allowing for good mass and heat transfer in between particles which is very important for uniform encapsulation by chemical vapor deposition of pigment flakes.

Compared with other deposition technologies like physical vapor deposition (PVD), the FBCVD method provides a variety of advantages. The PVD deposits the coating material mostly on the surface of the particles facing the flow of the vapor, whereas the FBCVD provides uniform coverage of the particles. Compared with PVD, the FBCVD provides not only higher growth rates due to its three dimensional growth characteristics, but also superior uniformity and conformity of the encapsulating layer(s) on microstructured core particles. This is extremely important in the case of encapsulation of diffractive pigment flakes where the surface of the flakes has symmetric alignment of groves with separation that can vary from few microns for low frequency gratings to as low as 250 nm for high frequency gratings, i.e. gratings with frequencies in the range of from 400 to 4000 grooves/mm.

The reactors used in our experiments were made of fused quartz. An example of a fluidized bed reactor is schematically shown in FIG. 6. The reactor has a removable top surface (not shown) which has access ports for instrumentation, introduction of gases and liquids, and extra vibration. Arrow 110 illustrates a channel for introduction of reactant gases such as N2, NH3, H2O, CO2, H2 and/or for injection of liquid precursors from the above. Optionally, Ar, He, or other inert gases are introduced to dilute or transfer the reactant. The precursor and/or reactant may be in the liquid or solid form. Liquids or solids can be heated in containers (called bubblers for liquid precursors); inert gases are introduced into the containers to transfer the vapor of the precursors. Usually solids have a low vapor pressure and have to be heated at higher temperatures using furnaces. Fluidization conditions can be changed based on visual observation of the bed by adjusting the flow rates using flow controllers. The top surface may also have vibration means 160, such as a mechanical vibrator, and exhaust means, such as exhaust filters or scrubbers; an arrow 120 shows an exhaust flow from the exhaust means. The instrumentation 130 may include thermocouples, an extraction system for extracting particles to control their optical properties, and other sensor devices.

Depending of the physical properties of the coating precursors (density, vapor pressure, etc.) the precursor 150 can be introduced upstream with the fluidizing gas (Ar, N2, He, etc.) 140 at the bottom of the reactor through a sintered alumina grid 170. Individual control of the fluidizing and precursor gases before entering into the reactor allows controlling the fluidization conditions of the bed. The precursor may be coming from a bubbler, e.g. SiCl4, TiCl4, SiHCl3 precursor, or from a different source of the precursor vapor, e.g. W(CO)6, Ni (CO)6 low vapor pressure solid precursors for W and Ni metals or compounds respectively can be heated at high temperatures using closed furnaces. The fluidizing gas may be provided from a flow controller for the fluidizing gas. In case the precursor has a low vapor pressure, e.g. some organo-metallics including tetraethoxysilane (TEOS) and triisobutylaluminium (TIBA), it may be also introduced directly through the top of the reactor using a metering liquid injector; the reactant and fluidizing gases in that case are provided through the bottom of the reactor.

The FBCVD reactor can operate under thermal or plasma activation. For a thermal activation, the bed may be heated externally by a cylindrical electric resistance furnace 150, or heated internally with a graphite susceptor and an external radio frequency (Rf) induction coil. An external Rf coil could also be used for plasma activation of the bed in case of plasma-assisted chemical vapor deposition having the advantage of non-equilibrium plasmas that can activated gaseous species at lower temperatures. In some cases, the FB reactor can have attached vacuum pumps for low pressure chemical vapor deposition (LPCVD); a vacuum pump may serve as or be part of exhaust means; filters may be used to avoid damaging the vacuum pumps.

Possible precursors include halides (chlorides, iodides and bromides). Hydrogen halide gases are by-products of the hydrolysis process.

The FBCVD may be based on the following chemical reactions:

$$TiCl4+H2O \rightarrow TiO2+HCl$$

for Titania deposition, and $$SiCl4+H2O \rightarrow SiO2+HCl$$

for Silica deposition.

Oxygen or ozone can be used instead of water to form the oxides. For the purpose of changing the oxidation conditions and avoiding possible homogeneous nucleation on the gas phase instead of on the surface of the flakes, mixtures of H2 and CO2 can be used instead of water or oxygen. The gas chemical reaction in this case will be:

$$H2+CO2 \rightarrow H2O+CO.$$

Other possible precursors are alkyl silanes such as trichlorosilane (SiHCl3) may be used for a SiO2 encapsulation. In addition, in some cases the original precursors in the gas phase react to form other chemical gases, e.g. TiCl3 is commonly observed in the gas phase when starting with TiCl4 as the precursor for TiO2 deposition.

Other chlorides such as AlCl3 and ZrCl4 can used to deposit their respective oxides.

The reactions with N2 or NH3 reactants result in formation of the corresponding metallic nitrides. Reaction with reactant gases providing carbon to the reactions (e.g. CH4) lead to formation of metallic carbides.

Halides may be used in combination with reactant gases providing oxygen, nitrogen and/or carbon to deposit oxides, nitrides, carbides or compound combinations such as oxynitrides, carbonitrides, oxycarbides, and oxycarbonitrides.

The alkoxides precursors may contain enough oxygen to form oxides without additional oxygen. However, often, O2 is used to minimize carbon incorporation into the deposited layers. Water can be used instead of oxygen as a reactant to lower the reaction temperature.

Examples of organometallic precursors used for the deposition of SiO2 include Tetraethoxysilane (TEOS) [Si(OC2H5)4], dimethyldiethoxysilane (DMDEOS) [(CH3)2Si(OC2H5)2], hexamethyldisiloxane (HMDSO) [CH3)3SiOSi(CH3)3], tetramethyldisiloxane (TMDSO), [(CH3)2HSiOSiH(CH3)2)], ethyltriethoxysilane (ETEOS) [C2H5Si (OC2H5)3], trimethylethoxysilane (TMEOS) [(CH3)3 SiOC2H5)].

Examples of organometallic precursors used for the deposition of TiO2 include titanium ethoxide, isopropoxide and the tert-butoxide.

The decomposition of Ti iso-propoxide Ti{OCH(CH3)2}4 can also be used in FBCVD:

$$Ti\{OCH(CH3)2\}4 \rightarrow TiO2+C3H8+C3H7OH+H2O$$
above 450 C.

Tantalum ethoxide (Ta(OC2H5)5) can be used with oxygen for the growth of another high index material Ta2O5.

Tri-isobutyl-aluminum (TIBA) is a pyrophoric liquid which decomposes at temperatures of above 200 C on aluminum and isobutene and can be used for depositing medium index (n about 1.65) aluminum oxide layers.

Notably, the deposited encapsulation layers may not be fully oxidized (e.g. metallic hydroxides) and thus may require annealing at high temperatures in the range of 400 to 900 C in order to achieve the desired stoichiometry.

Other precursors such as the carbonyls decompose at relatively low temperatures and deposit oxides. By way of example, Iron carbonyl Fe(CO)5 may be used to deposit Iron oxide:

$$2\ Fe(CO)5+O2 \rightarrow Fe2O3+5\ CO2$$

FIGS. 7A-10 illustrate dielectric diffractive flakes formed by providing a microstructured SiO2 core to a fluidized bed and encapsulating the microstructured dielectric core by chemical vapor deposition using a TiCl4 precursor which reacted with water vapor while the core is in the fluidized bed so as to form an encapsulation layer of TiO2 encapsulating the microstructured dielectric core.

Figure 7A:
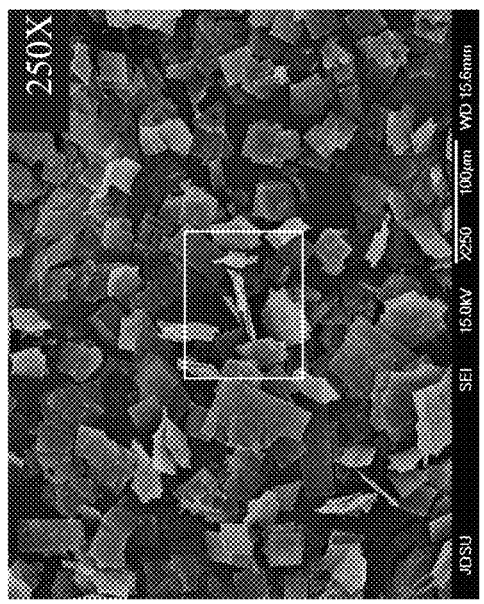
FIGS. 7A through 7D are SEM micrographs of diffractive pigment flakes.
Figure 7B:
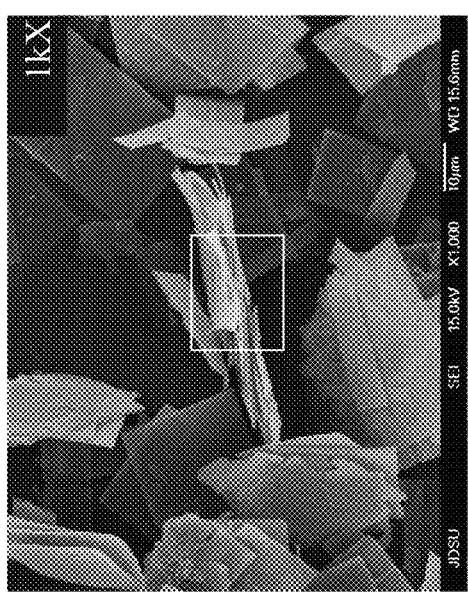
Figure 7C:
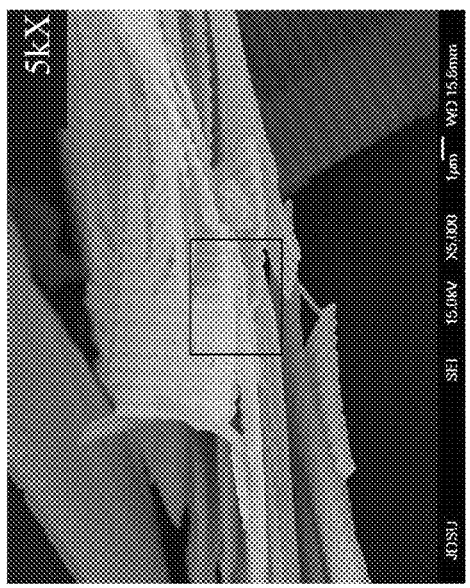
Figure 7D:
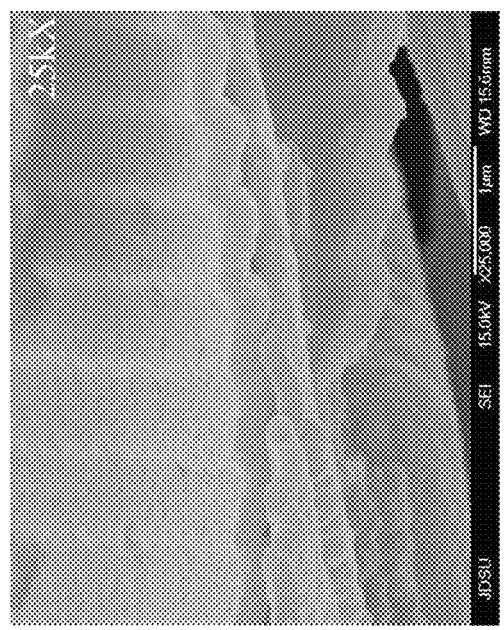

FIGS. 7A-7D show micrographs of diffractive pigment flakes made with a scanning electron microscope (SEM) under a variety of magnifications from 250× (FIG. 7A) to 25,000× (FIG. 7D); the micrographs in FIGS. 7A-7C show a small rectangle which is further magnified in a next picture. The flakes have a symmetric 3-layer TiO2/SiO2/TiO2 structure obtained by encapsulation of a microstructured single-layer core formed of SiO2 with a TiO2 encapsulating layer. The core is a shaped 25×25 microns pre-flake with a 1400 1/mm frequency diffraction grating.

Figure 8A:
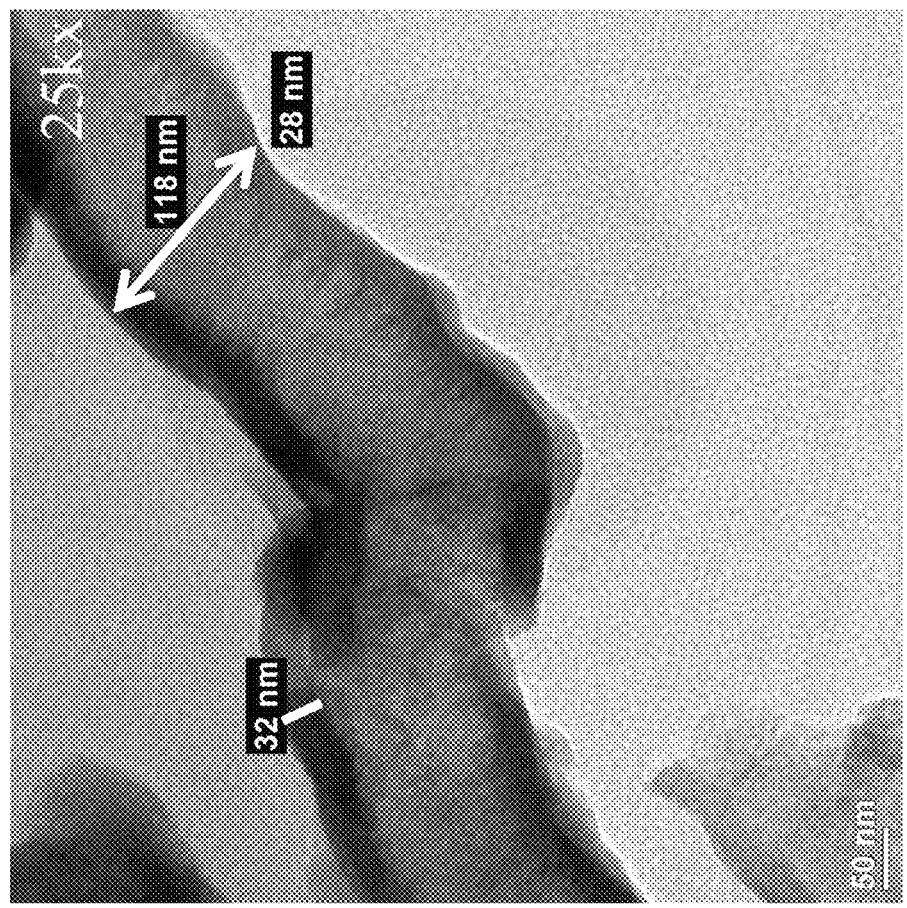
FIGS. 8A through 8C are TEM cross-sectional images of typical encapsulated flakes.
Figure 8B:
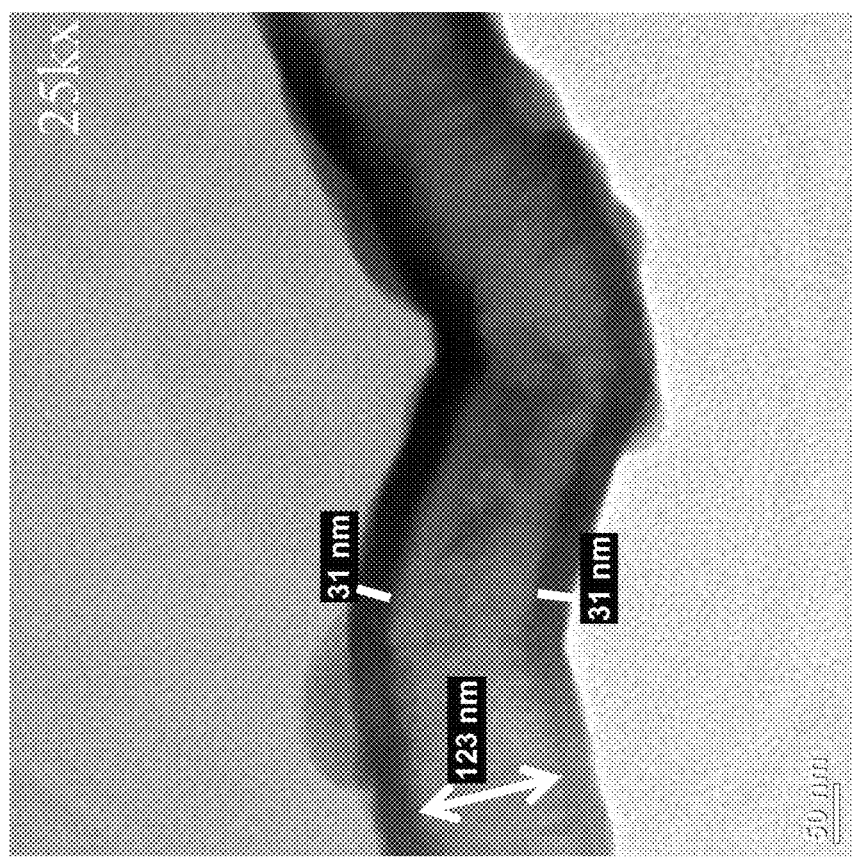
Figure 8C:

FIGS. 8A-8C show cross-sectional images of typical encapsulated flakes such as shown in FIGS. 7A-7D prepared for the analysis by ultramicrotomy using a transmission electron microscope (TEM) with the magnification of 25,000×. The SiO2 core is about 120 nm thick; the encapsulating TiO2 layer has a thickness of approximately 30 nm and is perfectly conforming to the microstructure of the core flake.

Figure 9:
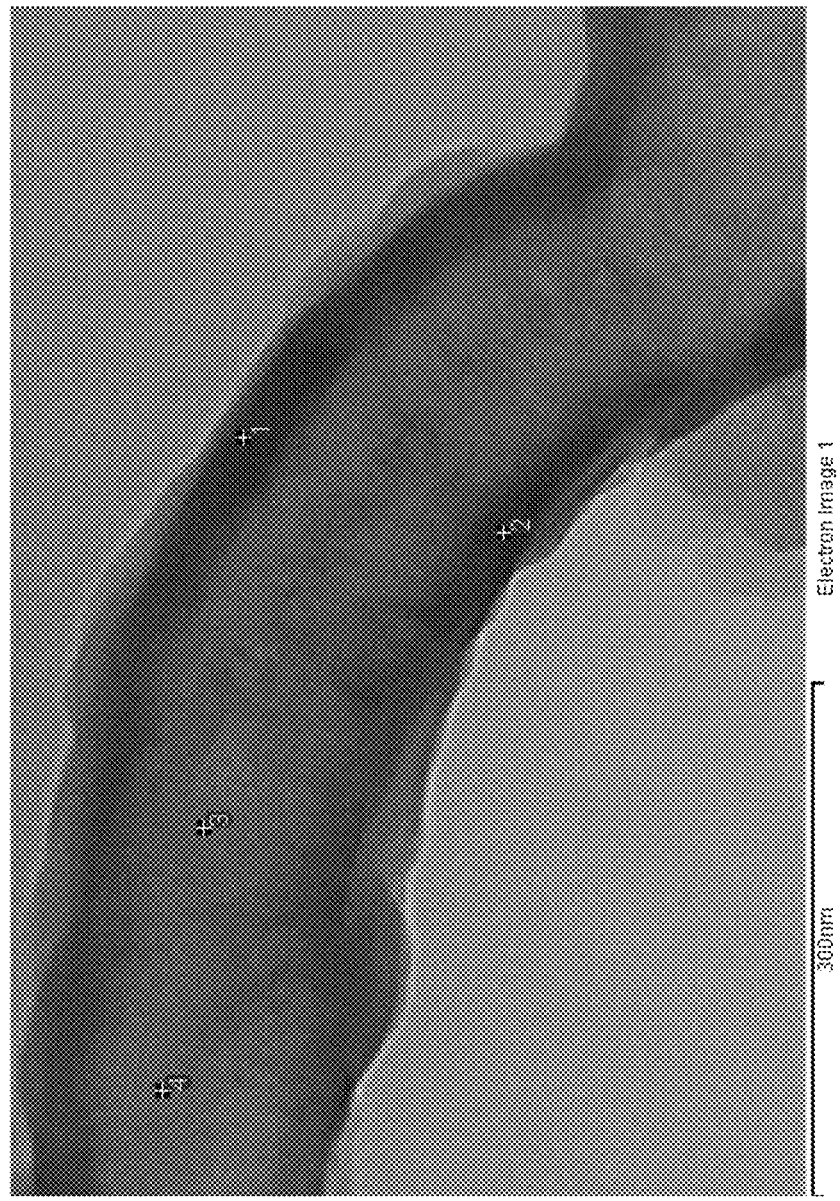
FIG. 9 is a STEM image of a flake edge.
Figure 10:
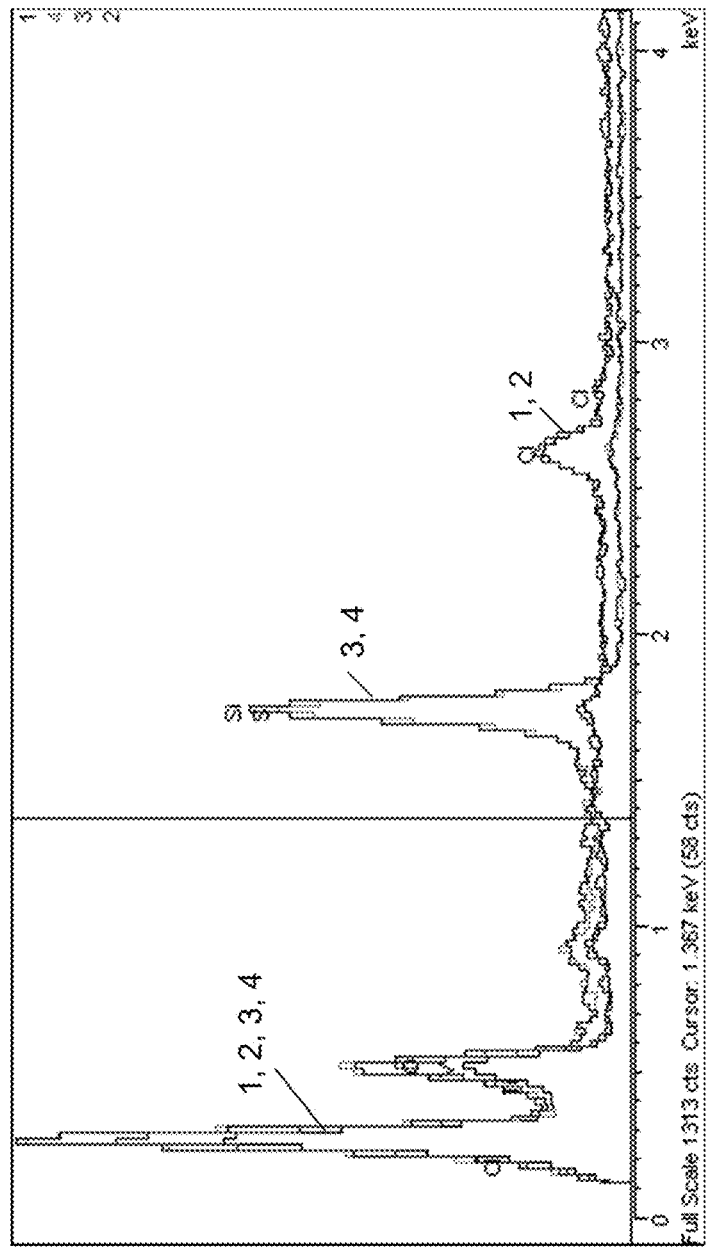
FIG. 10 is a plot with results of elemental analysis of the spectra from the areas marked in the STEM image shown in FIG. 9.

FIG. 9 shows an image of a flake edge made with a scanning transmission electron microscope (STEM), and FIG. 10 presents an Energy Dispersive X-ray Spectroscopy (EDS) elemental analysis of the spectra from the areas marked areas 1, 2,3, and 4 in the STEM image, wherein spectra areas 1 and 2 correspond to the TiO2 deposited layer and areas 3 and 4- to the SiO2 diffractive core pre-flake. Table 1 presents corresponding quantitative elemental analysis in atomic %. Cl was detected in TiOx layers. V signal is found in most Ti films. The presence of Ti and O2 verifies the nature of the encapsulating titania layer.

TABLE 1

| Spectrum | O | Si | Cl | Ti | V |
|---|---|---|---|---|---|
| Spectrum 1 | 23.45 | | 7.69 | 67.13 | 1.72 |
| Spectrum 2 | 30.00 | | 7.34 | 60.97 | 1.69 |
| Spectrum 3 | 53.20 | 40.37 | | 6.44 | |
| Spectrum 4 | 57.08 | 37.50 | | 5.42 | |

The encapsulation has been performed using the fluidized bed chemical vapor deposition in the presence of a TiCl4 precursor. However, other precursors can be used. By way of example, organometallics such as Ti-isopropoxide (Ti (OC3H7)4) can be used for the deposition of titania encapsulating layers.

In another embodiment, an all-dielectric flake may have more than one encapsulating layers. By way of example, a 7-layer symmetrical design is obtained by alternate deposition of TiO2, SiO2, and TiO2 onto a SiO2 microstructured core. The SiO2 layer can be deposited using silicon halides precursors as SiCl4 or with organometallic like Tetraethoxysilane TEOS (Si(OC2H5)4 or hexamethyldisiloxane HMDSO (Si2O(C2H3)3); the TiO2 layers and the core may be formed as described above.

Another possible design can start with a high index layer (e.g. TiO2) followed by the encapsulating deposition of SiO2 and TiO2. SiO2 and TiO2 materials have the advantage to be compatible with the cosmetic industry However, other materials with high and low refractive indices can be used on the all dielectric designs.

Fluidized Bed Chemical Vapor Deposition (FBCVD) and Chemical Precipitation are the two more appropriate technologies to coat the core platelets. However, the wet chemistry such as disclosed in U.S. Pat. No. 6,241,858 requires extensive separation in between solid core flakes so that the reactive liquid could contact as much surface of the flakes as possible. In addition, it requires drying and disagglomeration of the flakes after the drying step. As a counterpart technology, FBCVD avoids those additional steps. Because of mass and heat transfer and solid mixing, the FBCVD technique avoids the agglomeration problem associated with the wet chemistry methods.

Advantageously, the layers coated using the FBCVD technique are perfectly conforming to the surface microstructure of the diffractive core flakes which results in higher performance. When conventional methods are applied for coating microstructured flakes, low conformity of the encapsulating layers lead to deterioration or even complete loss of the diffractive effect caused by the microstructure of diffractive pigments. Conforming layers are extremely difficult to obtain by chemical precipitation or any other form of wet chemistry which, to the contrary, tend to produce non-conforming planarizing coated layers. Additionally, the FBCVD may be used for deposition of highly metallic absorber layers, i.e. layers which contain a high percent of metal, whereas chemical precipitation in general does not produce highly metallic layers.

I claim:

1. A method of forming a microstructured pigment flake comprising:
   depositing a single dielectric layer on a microstructured substrate to form a single microstructured dielectric layer;
   separating the single microstructured dielectric layer from the microstructured substrate;
   breaking only the single microstructured dielectric layer to form a plurality of microstructured dielectric cores;
   encapsulating the microstructured dielectric cores with one or more additional dielectric layers by chemical vapor deposition in a fluidized bed,
   wherein the microstructured pigment flake exhibits a diffractive effect provided by a grating in at least one of a surface of the microstructured dielectric core, and one or more additional dielectric layers.

2. The method as defined in claim 1, wherein the chemical vapor deposition includes a thermally activated reaction.

3. The method as defined in claim 1, wherein the chemical vapor deposition comprises plasma activation.

4. The method as defined in claim 1, wherein encapsulating the plurality of microstructured dielectric cores includes providing a fluidizing gas through the bottom of the fluidized bed.

5. The method as defined in claim 1, wherein encapsulating the plurality of microstructured dielectric cores includes providing a precursor to the fluidized bed from above.

6. The method as defined in claim 1, wherein encapsulating the plurality of microstructured dielectric cores includes providing a precursor through the bottom of the fluidized bed.

7. The method as defined in claim 1, wherein encapsulating the plurality of microstructured dielectric cores includes providing a reactant in a direction opposite to a flow of a precursor.

8. The method as defined in claim 1, wherein the chemical vapor deposition includes using an organometallic precursor.

9. The method as defined in claim 1, wherein the fluidized bed includes a porous or perforated bottom plate.

10. The method as defined in claim 1, wherein each of the plurality of microstructured dielectric cores comprises the grating in the surface thereof.

11. The method as defined in claim 10, wherein each of the one or more additional dielectric layers conforms to the grating in the surface of each of the plurality of microstructured dielectric cores.

12. The method as defined in claim 10, wherein each of the one or more additional dielectric layers replicates the grating in the surface of each of the plurality of microstructured dielectric cores.

13. The method as defined in claim 1, wherein the microstructured dielectric core is formed of a low refractive index material.

14. The method as defined in claim 1, wherein the one or more additional dielectric layers are formed of a high refractive index material.

15. A method of forming a microstructured pigment flake comprising:
   depositing only a single dielectric layer directly onto a microstructured surface to form a single microstructured dielectric layer;

separating the single microstructured dielectric layer from the microstructured surface;
breaking the single microstructured dielectric layer to form a plurality of microstructured dielectric cores;
encapsulating the microstructured dielectric cores by chemical vapor deposition in a fluidized bed,
wherein the microstructured pigment flake exhibits a diffractive effect provided by a grating in a surface of the microstructured dielectric layer.

* * * * *